(12) United States Patent
Chen et al.

(10) Patent No.: US 9,183,600 B2
(45) Date of Patent: Nov. 10, 2015

(54) TECHNOLOGY PREDICTION

(71) Applicant: International Business Machines Corporation, Armonk, NY (US)

(72) Inventors: Ying Chen, San Jose, CA (US); Bin He, San Jose, CA (US); Qi He, San Jose, CA (US); Xin Jin, Urbana, IL (US); W. Scott Spangler, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 13/738,193

(22) Filed: Jan. 10, 2013

(65) Prior Publication Data

US 2014/0195471 A1 Jul. 10, 2014

(51) Int. Cl.
*G06F 15/00* (2006.01)
*G06F 15/18* (2006.01)
*G06Q 50/18* (2012.01)
*G06N 99/00* (2010.01)
*G06F 17/30* (2006.01)

(52) U.S. Cl.
CPC ........ *G06Q 50/184* (2013.01); *G06F 17/30595* (2013.01); *G06N 99/00* (2013.01)

(58) Field of Classification Search
CPC .............................. G06K 9/228; G06H 9/6253
See application file for complete search history.

(56) References Cited

U.S. PATENT DOCUMENTS

| | | | |
|---|---|---|---|
| 6,505,197 B1 | 1/2003 | Sundaresan et al. | |
| 7,035,861 B2 | 4/2006 | Kayahara | |
| 7,490,092 B2 | 2/2009 | Sibley et al. | |
| 7,503,000 B1 | 3/2009 | Kreulen et al. | |
| 7,693,683 B2 | 4/2010 | Ihara | |
| 7,730,085 B2 | 6/2010 | Hassan et al. | |
| 7,860,873 B2 | 12/2010 | Campbell | |
| 2003/0204496 A1 | 10/2003 | Ray et al. | |
| 2004/0167907 A1 | 8/2004 | Wakefield et al. | |
| 2010/0146006 A1* | 6/2010 | Dasgupta et al. | 707/802 |
| 2011/0202334 A1 | 8/2011 | Abir | |
| 2011/0208776 A1 | 8/2011 | Lee et al. | |
| 2011/0213804 A1 | 9/2011 | Lee et al. | |

(Continued)

FOREIGN PATENT DOCUMENTS

| | | |
|---|---|---|
| JP | 2003167894 | 6/2003 |
| JP | 2006331001 | 12/2006 |

OTHER PUBLICATIONS

'Prospective Client Driven Technology Recommendation': He, 2012, IEEE, 978-0-7695-4770, pp. 110-119.*

(Continued)

*Primary Examiner* — Kakali Chaki
*Assistant Examiner* — Peter Coughlan
(74) *Attorney, Agent, or Firm* — Cantor Colburn LLP

(57) ABSTRACT

Embodiments of the invention relate to technology prediction. A technical dictionary of technical terms is constructed based on a collection of documents. The technical terms are partitioned into equivalence classes. A table is generated that correlates technical terms across equivalence classes based on temporal co-occurrence of the technical terms across the equivalence classes. For a given technical term the table is accessed to determine a first set of technical terms that correlate to the given technical term. The table is accessed again to determine a second set of technical terms that correlate to the first set of technical terms. It is predicted that the second set of technical terms will correlate to the given technical term in the future.

18 Claims, 6 Drawing Sheets

(56) References Cited

U.S. PATENT DOCUMENTS

2011/0289096 A1* 11/2011 Barney .................... 707/749
2012/0323758 A1* 12/2012 Henning .................... 705/37

OTHER PUBLICATIONS

'Self-Organizing Maps for Topic Trend Discovery': Rzeszutek, 2010, IEEE, IEEE Signal Processing Letters, vol. 17, No. 6, Jun. 2010, pp. 607-610.*

D. Bollegala et al., "Relational Duality: Unsupervised Extraction of Semantic Relations between Entitites on the Web" IW3C2, WWW 2010, Apr. 26-30, 2010, pp. 151-160.

E. Agichtein et al., "Snowball: Extracting Relations from Large Plain-Text Collections" Proceedings of the Fifth ACM Conference on Digital Libraries. 2000. pp. 85-94.

M. Finkelstein-Landau, et al., "Extracting Semantic Relationships between Terms: Supervised vs. Unsupervised Methods" In Proceedings of International Workshop on Ontological Engineering on the Global Information Infrastructure: May 13, 1999, pp. 1-10.

W. Guo, et al., "Mining Relationship Associations from Knowledge about Failures Using Ontology and Inference" Department of Frontier Sciences and Science Integration, Division of Project Coordination, The University of Tokyo, P. Perner (ED.): ICDM 2010, LNAI 6171, pp. 617-631.

* cited by examiner

TECHNOLOGY PREDICTION

BACKGROUND

The present disclosure relates generally to predicting future technologies, and more specifically, to predicting future technologies based on identified relationships between current technologies.

The ability to identify relationships between current technologies is used, for example, to improve search engine query recommendations by suggesting related queries, or to automatically identify relevant technologies of a product for technology road mapping. Knowing the relationships between technologies is also useful in technology licensing to identify relevant technologies owned by a source company for possible licensing agreements.

BRIEF SUMMARY

An embodiment is a method for technology prediction that includes constructing a technical dictionary of technical terms based on a collection of documents. The technical terms are partitioned into equivalence classes. A table is generated that correlates technical terms across equivalence classes based on temporal co-occurrence of the technical terms across the equivalence classes. For a given technical term the table is accessed to determine a first set of technical terms that correlate to the given technical term. The table is accessed again to determine a second set of technical terms that correlate to the first set of technical terms. It is predicted that the second set of technical terms will correlate to the given technical term in the future.

Another embodiment is a computer program product for technology prediction. The computer program product includes a computer readable storage medium having program code embodied therewith. The program code is executable by a processor to construct a technical dictionary of technical terms based on a collection of documents. The technical terms are partitioned into equivalence classes. A table is generated that correlates technical terms across equivalence classes based on temporal co-occurrence of the technical terms across the equivalence classes. For a given technical term the table is accessed to determine a first set of technical terms that correlate to the given technical term. The table is accessed again to determine a second set of technical terms that correlate to the first set of technical terms. It is predicted that the second set of technical terms will correlate to the given technical term in the future.

A further embodiment is a system for technology prediction that includes a memory having computer readable computer instructions and a processor for executing the computer readable instructions. The instructions include constructing a technical dictionary of technical terms based on a collection of documents. The technical terms are partitioned into equivalence classes. A table is generated that correlates technical terms across equivalence classes based on temporal co-occurrence of the technical terms across the equivalence classes. For a given technical term the table is accessed to determine a first set of technical terms that correlate to the given technical term. The table is accessed again to determine a second set of technical terms that correlate to the first set of technical terms. It is predicted that the second set of technical terms will correlate to the given technical term in the future.

A further embodiment is a method for technology prediction that includes determining current relationships between technologies. The determining includes constructing a list of technical terms based on a collection of technical documents. The technical terms are grouped into technologies and a table is generated that correlates the technologies based on temporal co-occurrence of the technologies in the technical documents. Future relationships between the technologies are predicted. For each technology, the predicting future relationships includes locating a first set of technologies in the table that correlate to the technology, locating a second set of technologies in the table the correlate to the first set of technologies, and identifying the second set of technologies as having a future relationship to the technology.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
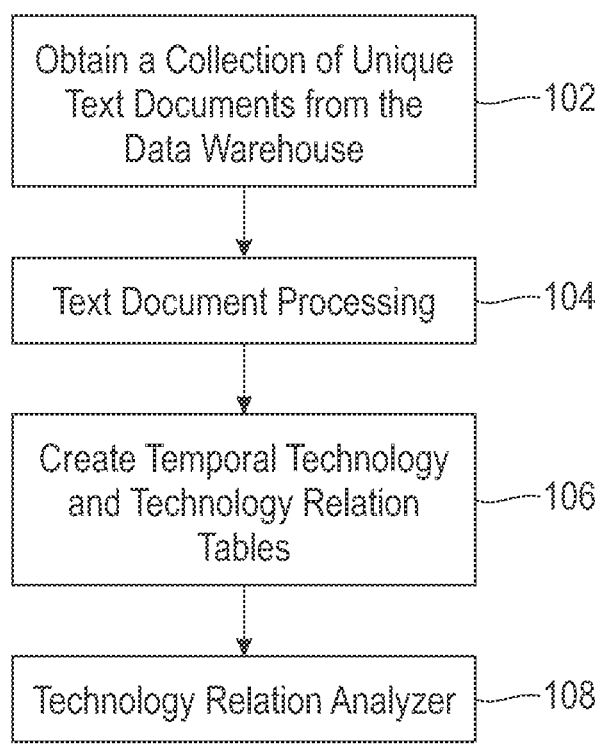
FIG. 1 depicts a process flow for providing technology prediction in accordance with an embodiment.

Embodiments described herein provide a technology prediction tool that predicts future technologies based on current relationships between technologies. The technology prediction tool is a time aware technology relation mining system that may be used, for example, to aid in technology road mapping by automatically predicting future technologies for a product. The technology prediction tool may also be used to locate patents of particular technologies for licensing to prospective clients when the particular technologies are predicted by an embodiment of the tool to be correlated to the existing technologies of prospective clients. Additionally, the technology prediction tool may be used to assist in discovering hidden technology relations that do not explicitly exist among directly related technologies in documents.

As used herein the term "time aware" refers to all data statistics that are computed and stored for a given interval of time. As used herein, the terms "time based co-occurrence" and "temporal based co-occurrence" are used interchangeably to refer to the number of data units (e.g., documents, paragraphs, snippets and/or sentences) containing two technology terms in a given interval of time. As used herein, the terms "relationship" and "relation" are used interchangeably to refer to the fact that two technology terms connect to each other explicitly (e.g., based on co-occurrence) or implicitly (e.g., based on association rules and/or citations) in the data.

Embodiments of the technology prediction tool described herein predict future relationships between technologies and future combinations of technologies. In an embodiment, a technical dictionary of technical terms is constructed based on a collection of documents using, for example, an n-gram method, to automatically identify technical terms in the documents. The technical terms in the technical dictionary may be clustered into equivalence classes so that the terms in each class have similar meanings. In an embodiment, one or more representative technical terms are selected from each equivalence class to represent a technology in order to allow the technology prediction tool to focus on sophisticated technology relationships in the collection of documents, rather than on simple general term relationships. A compact time-aware technology relation table (CTTR table) is generated to represent a time based co-occurrence of technologies. The CTTR table correlates technical terms across equivalence classes based on temporal co-occurrence of the technical terms across the equivalence classes.

A time aware technology relation measurement function, referred to herein as "TCorr", is used by embodiments to predict future emerging technology relationships after considering the temporal dimension in the CTTR table. The TCorr is contrasted to time-agnostic traditional approaches that can only detect whether two terms are related or not in history. A technology relation prediction model is built based on the CTTR table and a measure of TCorr for the time-aware relationships between two technology terms. In an embodiment, the technology relation prediction model is built in three steps: 1) for a given technical term Y, determine a first set of correlated technical terms that inspired the given technical term Y in history. The inspiring relationship is measured by the conditional probability $P(Y|X)$, where X is one inspiring technology; 2) compute the inspiring score $P(Y|X)$ for the first set of inspiring technologies. The probability $P(Y|X)$ is proportional to the number of technology terms correlating to X in an earlier time that will also correlate to Y later in data; 3) determine a second set of terms that are correlated with the first set of inspiring technology terms in history, thereby predicting the second set of terms that will be correlated with the given technical term Y in the future.

Turning now to FIG. 1, a process flow for providing technology prediction in accordance with an embodiment of the technology prediction tool is generally shown. As shown in FIG. 1, at block 102, a collection of unique text documents are obtained from a data warehouse. At block 104, the obtained text documents are processed. At block 106, one or more tables, such as a CTTR table and a technology relation table, are created. At block 108, a technology relation analyzer is applied to the created tables. Each of the blocks in FIG. 1 is described in further detail below in connection with one or more exemplary embodiments.

Figure 2:
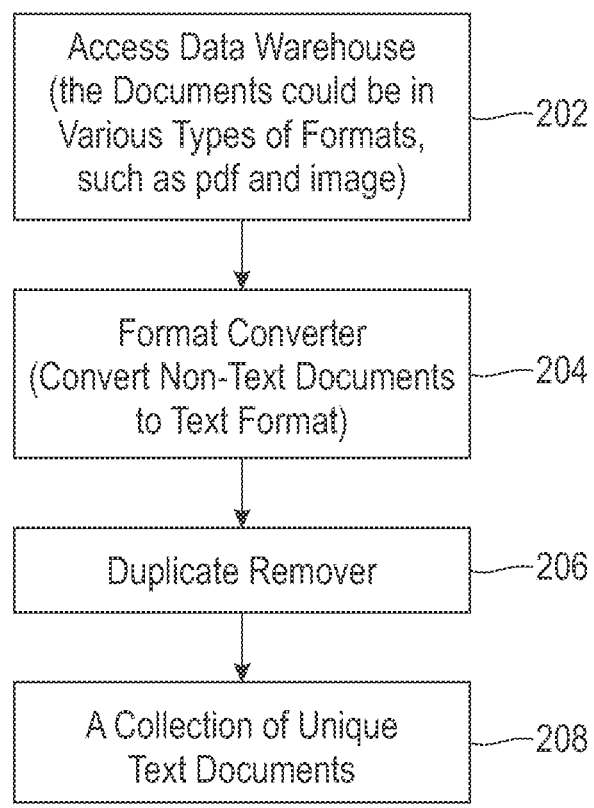
FIG. 2 depicts a process flow for obtaining documents in accordance with an embodiment.

Referring now to FIG. 2, a process flow for obtaining a collection of unique text documents from a data warehouse in accordance with an embodiment is generally shown. In an embodiment, the process shown in FIG. 2 is performed by the technology prediction tool executing on a computer. At block 202, a data warehouse is accessed. The documents in the data warehouse may be in various formats, such as text, portable document format (PDF) and image. At block 204 a format converter is utilized to convert any non-text formatted documents to text formatted documents. At block 206, a duplicate remover is applied to the converted documents to detect any duplicates of documents and to remove all but one copy of the duplicate documents. At block 208, a collection of non-redundant text documents is obtained.

Figure 3:
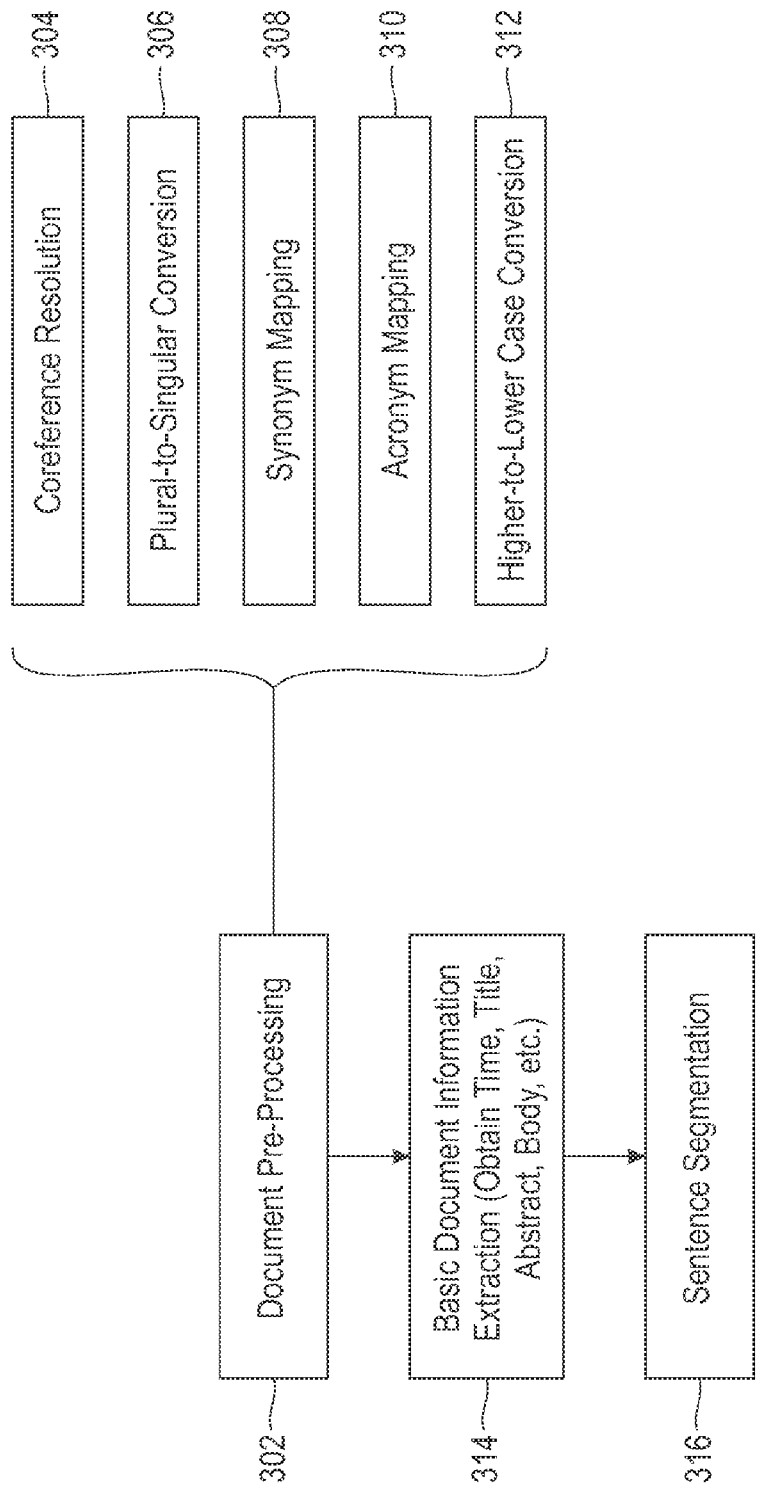
FIG. 3 depicts a process flow for processing one or more documents in accordance with an embodiment.

Referring now to FIG. 3, a process flow for processing the collection of non-redundant text documents obtained at block 208 of FIG. 2 in accordance with exemplary embodiments is generally shown. In an embodiment, the process shown in FIG. 3 is performed by the technology prediction tool executing on a computer. At block 302, document pre-processing is performed. As shown in the embodiment in FIG. 3, document pre-processing 302 includes processing blocks 304, 306, 308, 310, and 312.

At block 304, coreference resolution is performed. As used herein, the term "coreference" refers to a linguistic phenomenon that occurs when multiple expressions in a document refer to the same thing. As an example, consider the following sentences: "LCD is a flat panel display that uses liquid crystals. It has low electrical power consumption. It is used in many applications, such as computer monitor, instrument panel and aircraft cockpit display." In an embodiment, during coreference resolution at block 304, the word "It" is replaced with "LCD" in the second and third sentences.

At block 306, plural-to-singular conversion is performed to change words from plural to singular. For example, the term "display devices" may be changed to "display device", the term "thin film transistors" may be changed to "thin film transistor", the term "LCDs" changed to "LCD", etc.

At block 308, synonym mapping is performed to map synonyms to a common term, by choosing the most frequently used term. For example, the terms "hard disk drive", "hard drive", "hard disk" may be mapped to the term "hard disk drive." In another example, the terms "virtual community", "on-line community" and "online community" may be mapped to "online community." In some embodiments, synonyms are obtained from synonym dictionaries and online resources, such as Wikipedia. In addition, synonyms may be obtained by searching the web for synonym related expressions such as "is also called", "commonly known as" and "also known as."

At block 310, acronym mapping is performed to map an acronym to its original phrase. Many technical terms have acronyms, e.g., hard disk drive (HDD), liquid crystal display (LCD), single-level cell (SLC), direct rendering infrastructure (DRI) and complex regional pain syndrome (CRPS). If one acronym may refer to multiple phrases, the context around the acronym in the sentence may be used to estimate the most possible or likely phrase.

At block 312, higher-to-lower case conversion is performed to change letters to lower case. For example, "Display Devices" is changed to "display devices", and "Liquid Crystal Display" is changed to "liquid crystal display".

The documents pre-processing block 302 changes the contents of the documents as described above in blocks 304-312. After the document pre-processing has completed, block 314 is performed to extract basic document information from one or more of the documents. For example, various fields such as, but not limited to, time, title, abstract, body, may be extracted. In an embodiment, the basic document information is used to compute the time based co-occurrences for each pair of technology terms.

At block 316, sentence segmentation is performed to segment a document into its constituent sentences. In an embodiment, ".", "?" and "!" are used as a sentence delimiter. Regular expressions are also used to avoid some special cases, such as "i.e.", "e.g.", "No. 1" and "Inc., New York".

Figure 4:
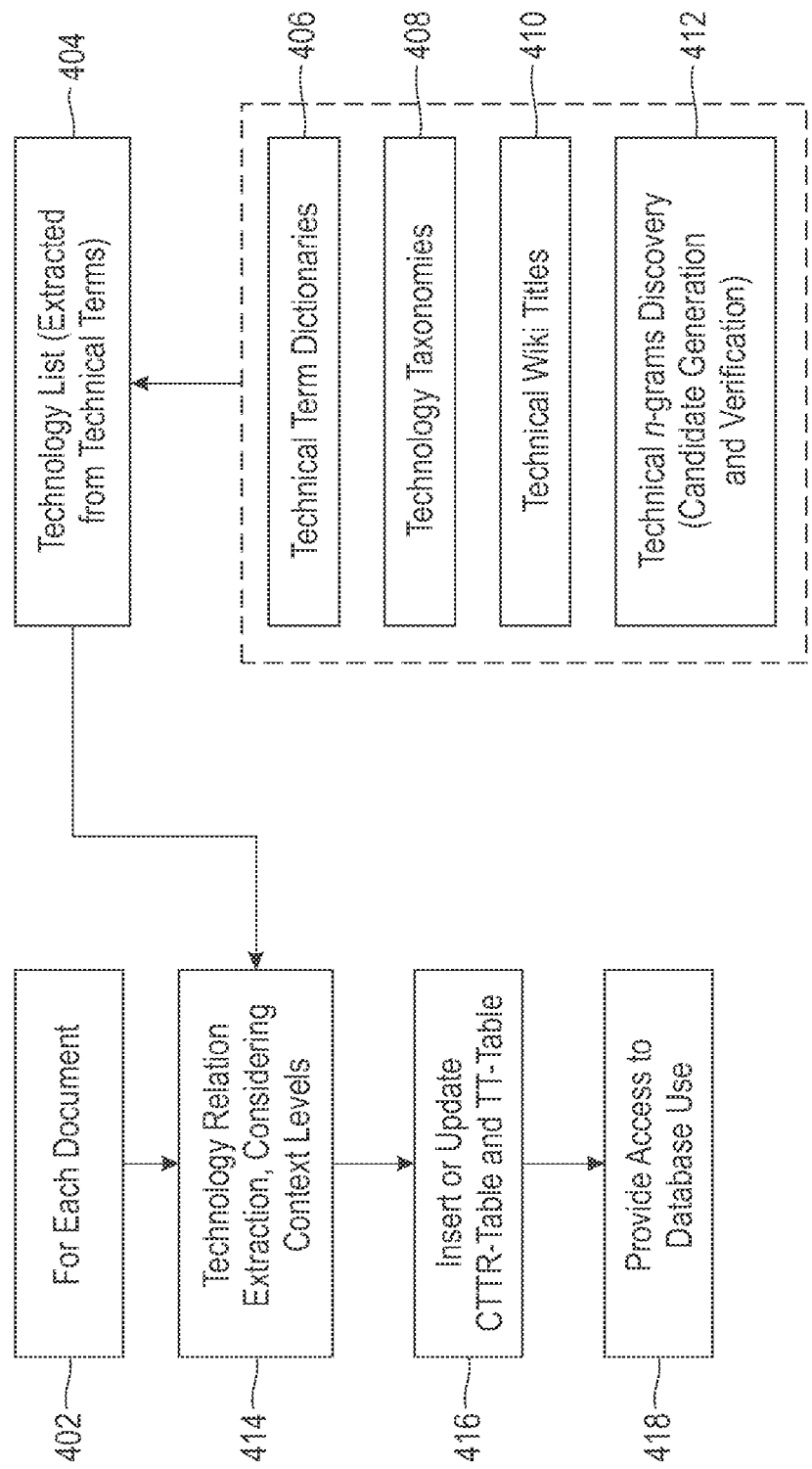
FIG. 4 depicts a process flow for creating one or more tables in accordance with an embodiment.

Referring now to FIG. 4, a process flow for creating one or more tables, such as a CTTR table and a technology relation table, in accordance with exemplary embodiments is generally shown. In an embodiment, the process shown in FIG. 4 is performed by the technology prediction tool executing on a computer. As shown in FIG. 4, documents, including any extracted basic document information, are analyzed and processed to generate one or more technology tables. As shown by block 402, the processing performed in FIG. 4 is performed for each document in the collection of documents retrieved from the data warehouse.

At block 404, a technology list (e.g., of technical terms) is extracted from the technical terms using techniques such as those as shown in one or more of blocks 406, 408, 410, and 412. At block 404 a list of technical terms is obtained, and then technical terms which represent the same or similar technology are merged to get a list of technologies. In an embodiment, the most representative technical term is used to represent a technology.

At block 406, the technology is referred to by a term found in a technical dictionary. At block 408, the technology is referred to by a term manually generated based on technology taxonomies, such as, but not limited to the Association for Computing Machinery (ACM) Computing Classification System, the Institute of Electrical and Electronics Engineers (IEEE) Computer Society Keywords, and Medical Subject Heading (MeSH) terms. At block 410, the technology is referred to by a term that is generated by a classifier to identify technical terms from Wikipedia titles. At block 412, the technology is referred to by a term that is generated using a technical n-gram discovery process to automatically extract technical n-grams from the collection of documents using a process such as that described in U.S. Pat. No. 7,503,000 B1 entitled "Method for Generation of an N-word Phrase Dictionary From a Text Corpus." When the collection of documents includes patents, the technical n-gram terms may be verified in exemplary embodiments based on the following extract measures: (1) support: the number of patents which contain the term; (2) Class Count: the number of classes (e.g., United States Patent and Trademark Office (USPTO) classes or International Patent Classification (IPC) classes) the term has appeared in; (3) Class Count Rate: the value of Class Count divided by Support; and (4) Max Rate: the number of patents which contain the term and belong to the major class (the most frequent class of the term) divided by Support.

In an embodiment, the following basic rules are used at block 412 to verify technical terms from the candidates: (1) an important technical term should be mentioned in many patents, so the value of Support should not be small (i.e., not less than a first specified threshold); (2) a technical term is usually not a general term, and is used in limited domains, so the value of Class Count Rate should be low (i.e., less than a second specified threshold)(Class Count Rate is used instead of Class Count in order to reduce the impact of frequent terms, i.e., those terms with large Support value); and (3) many technical terms are domain specific and thus, the value of Max Rate is expected to be high (i.e., exceeds a third threshold). Table 1 below shows an example list of technical terms identified by technical n-gram discovery.

TABLE 1

| Technical Terms | Support | Class Count | Class Count Rate | Max Rate |
|---|---|---|---|---|
| Polynucleotide | 95869 | 184 | 0.001919 | 0.428574 |
| P-Toluenesulfonic Acid | 51955 | 179 | 0.003445 | 0.430026 |
| Regulatory Sequence | 50910 | 109 | 0.002141 | 0.415537 |
| Immuno Deficiency | 47296 | 150 | 0.003172 | 0.272518 |
| Diastereomer | 45235 | 123 | 0.002719 | 0.662938 |
| Biosynthesis | 42921 | 140 | 0.003262 | 0.295823 |
| Paraformaldehyde | 37599 | 192 | 0.005107 | 0.216522 |
| Point Mutation | 33792 | 97 | 0.002871 | 0.476059 |

TABLE 1-continued

| Technical Terms | Support | Class Count | Class Count Rate | Max Rate |
|---|---|---|---|---|
| Adrenalize | 32298 | 125 | 0.00387 | 0.330268 |
| Hypersensitivity | 29198 | 189 | 0.006473 | 0.355915 |
| Proxy Server | 19161 | 89 | 0.004645 | 0.287772 |
| Virtual Reality | 13441 | 195 | 0.014508 | 0.209583 |

The above approach, when used on patent documents, is an automatic process for detecting technical terms without the need of a manually generated dictionary. The above approach may discover recent technical terms that have not yet been included in any dictionary.

Referring to block 414 in FIG. 4, technology relation extraction is performed to identify occurrences of technologies in a document. In an embodiment, if two or more technologies occur in the same sentence, then the technologies are treated as being related. For each sentence, all technologies are identified and then a relation between each pair of technologies is added. More generally, given any set of "m" technologies, if the technologies occur in the same sentence, the technologies are treated as being related. Beyond a sentence level relation, other context levels may also be considered at block 414. Examples include, but are not limited to: snippet level (co-occurrence in the same, previous and next sentence), paragraph level (co-occurrence in the same paragraph), and document level (co-occurrence in the same document). In an embodiment, the title and the abstract are given higher importance than the main body of a document. In this case, co-occurrence in a title or abstract is assigned a higher relation score than co-occurrence in the main text body.

At block 416, a temporal technology relation (TTR) table and a temporal technology (TT) table are updated. In an embodiment, the TTR table is defined in the form of (Time Set; Technology Set; Score Set).

Time Set corresponds to a set of time information entities. Some documents, such as news articles and research publications, may only have one time entity in the set, e.g., the publication time. There may be different intervals of time, such as second, minute, hour, day, week, month, quarter and year. The year interval is described herein for purposes of illustration, however, embodiments are not limited to the year interval, as any interval of time may be used.

Publication Year corresponds to the publication year and may be extracted for a document from the data directly. Some documents may have more than one time entity. For example, a patent may have two time entities: filing date and publication date. Therefore, Publication Year and File Year may be extracted for patents, where Publication Year is the publication year of the patent, and File Year is the filing year of the patent.

Score Set corresponds to a set of scores, including, but not limited to Frequency Document (the number of documents where the set of technologies co-occur), Frequency Paragraph (the number of paragraphs where the set of technologies co-occur), and Frequency Sentence (the number of sentences where the set of technologies co-occur).

In an embodiment, the Technology Set may be a set of "m" (where m is greater than one) technologies. In order to make a table compact, embodiments require the set of technologies to be ordered by string comparison, and this compact table is referred to as the CTTR table. In an embodiment, the CTTR is in the form of (Publication Year; <term smaller (TS), term larger (TL)>; {Frequency Document, Frequency Sentence}). Given two technical terms, string comparisons are performed based on an alphabetical ordering of characters at each corresponding position. The smaller term is put into TS, and the bigger term is put into TL. Take the term pair "liquid crystal display" and "thin film" as an example. "Liquid crystal display" is smaller than "thin film", so "liquid crystal display" is be put into TS, and "thin film" is put into TL. In the CTTR table, the same term may be put to either TS or TL, depending on which other term it is compared with.

Table 2 below shows an embodiment of a CTTR table, where Time Set={Publication Year}, Technology Set={TS, TL} and Score Set={Frequency Document, Frequency Sentence}. The record (2000; <alphanumeric keyboard, desktop computer>; 20, 80) in Table 2 means that in the year 2000, terms "alphanumeric keyboard" and "desktop computer" occurred together in 20 documents and 80 sentences.

TABLE 2

| Time Set | Technology Set | | Score Set | |
|---|---|---|---|---|
| Publication Year | TS | TL | Frequency Document | Frequency Sentence |
| 2000 | alphanumeric keyboard | desktop computer | 20 | 80 |
| 2000 | ion implantation | semiconductor device | 14 | 75 |
| 2000 | amorphous silicon | thin film transistor | 16 | 36 |
| 2000 | amorphous silicon | heat treatment | 18 | 49 |
| 2000 | optical amplifier | rare earth | 15 | 35 |
| 2005 | data line | liquid crystal display | 58 | 270 |
| 2008 | gate line | liquid crystal display | 10 | 78 |
| 2006 | liquid crystal display | manufacture method | 35 | 110 |
| 2009 | display unit | liquid crystal display | 4 | 35 |
| 2004 | liquid crystal display | polarize plate | 8 | 30 |
| 2006 | liquid crystal display | view angle | 29 | 78 |

When compared to the use of a traditional relation table for each technical term, the CTTR table saves all relations and uses term ordering to save on storage costs (e.g., 50%) while preserving the same information. For example, if there are five technical terms, and the technical terms are related to each other, then under the traditional approach, there would be five tables and each of the five tables would have four records, with a total of twenty records to be stored. This contrasted to the CTTR table described herein, where only ten records are stored.

In an embodiment, to further improve the compactness of the CTTR table, a name identifier map and an identifier name map are built to map technical terms from string format to integer format in order to save storage space. When a string query is sent, the name identifier map is checked to find the corresponding identifier, which may be used to fetch matching records. Then, the identifier name map is used to reveal the string.

In an embodiment, a TT table as mentioned in block 416 of FIG. 4 is built to save a trend of one or more technical terms. For example, the TT table may store the time based scores for each technology. For example, (Publication Year; Term; {Frequency Document, Frequency Paragraph, Frequency Sentence}) may correspond to an instance of a TT table. In such a TT table, the record (2000; liquid crystal display; {100, 300, 500}) may mean that in the year 2000, the term "liquid crystal display" appeared in 100 documents, 300 paragraphs and 500 sentences.

At block 418 of FIG. 4, access is provided to a database that stores the tables, such as those described above.

Figure 5:
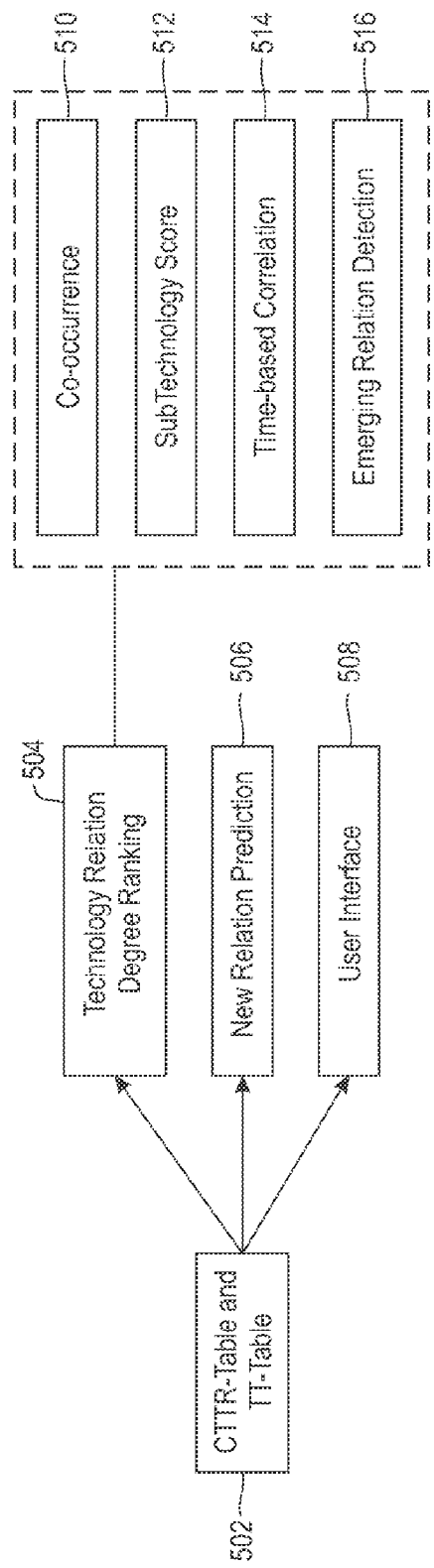
FIG. 5 depicts a process flow for analyzing technologies in accordance with an embodiment.

Referring now to FIG. 5, a process flow for analyzing technologies in accordance with exemplary embodiments is generally shown. In one or more embodiments, the process flow of FIG. 5 is implemented by the technology prediction tool described herein. In one or more embodiments, the process flow of FIG. 5 is used to process one or more documents from block 208 in FIG. 2. As shown at block 502 of FIG. 5, the processing is based on the CTTR table and the TT table of block 416 of FIG. 4.

At block 504, a technology relation degree ranking is performed. Block 504 may include several blocks, operations, or processes, such as, but not limited to blocks 510, 512, 514 and 516. In order to compute a relation degree between technologies, block 504 uses information stored in the TT table and CTTR table. For instance, an example query takes the form: (q="liquid crystal display" AND Publication Year: [2000 TO 2011] AND Score Type="Frequency Sentence"). This query looks for technologies that are related to "liquid crystal display" during the years from 2000 to 2011. In an embodiment, the query is processed as follows:

Operation 1: from the CTTR table, fetch records that match (TS="liquid crystal display" OR TL="liquid crystal display" AND Publication Year: [2000 TO 2011] AND Score Type="Frequency Sentence"). Denote $R_q$ as the set of related technologies obtained from the result. Suppose the size of $R_q$ is m, which means there are m technologies which are related to the query q. Generate $S_{qi}=\{f_j|j=2000,\ldots,2011,$ where $f_j$ is the Frequency Sentence score for Publication Year j$\}$ as the trend of the co-occurrence relation between the query q and the ith technology in $R_q$. Let $S_{qi}(j)=f_j$ for the trend.

Operation 2: from the TT table, fetch records that match (T="liquid crystal display" AND Publication Year: [2000 TO 2011]). Generate a time-based frequency trend $S_q$ based on the returned matching records. Similarly, obtain frequency trends for related technical terms. Denote $S_i$ as the frequency trend of the ith technology in $R_q$.

In some embodiments, one or more of the following measures are used to define how closely two technologies are related to each other.

Co-occurrence 510. Potentially the simplest way to measure the relation degree between technology q and technology i is to use the co-occurrence score CooC(q, i):

$$CooC(q,i)=F(q,i)=\Sigma_j S_{qi}(j) \qquad (1)$$

SubTechnology 512. Technologies may form a concept hierarchy. To estimate the possibility that technology i is a sub-technology of q, an occurrence score F(i) of technology i is obtained, $$F(i)=\Sigma_j S_i(j) \qquad (2)$$

and then a SubTechnology score is computed as SubTech (q, i):

$$SubTech(q, i) = \frac{F(q, i)}{F(i)} \qquad (3)$$

Time-Based Correlation (TCorr) 514. Mean (S) is denoted as the mean frequency value of a frequency trend "S". A time-series correlation between $S_q$ and $S_i$ is computed as Corr($S_{qi}$, $S_i$):

$$Corr(S_q, S_i) = \frac{\sum_j [(S_q(j) - \text{Mean}(S_q)) * (S_i(j) - \text{Mean}(S_i))]}{\sqrt{\sum_j (S_q(j) - \text{Mean}(S_q))^2} \sqrt{\sum_j (S_i(j) - \text{Mean}(S_i))^2}} \quad (4)$$

Similarly, $Corr(S_{qi}, S_{qi})$ is computed as the correlation between $S_q$ and $S_{qi}$, and $Corr(S_i, S_{qi})$ as the correlation between $S_i$ and $S_{qi}$.

Finally, the TCorr 514 between the query technology q and technology i is computed as TCorr(q, i):

$$TCorr(q, i) = \frac{w_1 * Corr(S_q, S_i) + w_2 * Corr(S_q, S_{qi}) + w_3 * Corr(S_i, S_{qi})}{w_1 + w_2 + w_3} \quad (5)$$

where $w_i$ is the weight of each component. The weights may simply be set all to one, or adjusted based on learning.

Emerging Relation Detection 516. Emerging relations based on the time-based trends of $S_{qi}$, for all i in $R_q$ are detected. While previous studies may tend to focus on detecting emerging technologies, embodiments described herein detect emerging relations between technologies.

At block 506 a new technology relation prediction is performed. Given a technology Y, it is possible to predict which technology j could be or would be related to or combined with technology Y to form a new concept or idea. For example, when "social network" was used during the early stages of basic content information sharing, a question could be posed whether it would have been possible to predict the use of a location based social network, such as Foursquare. To predict a new relation between, e.g., a location and a social network is challenging because such a relation was not previously proposed.

Embodiments provide a solution for the foregoing question by identifying inspiring technologies that could bring two technologies together. In the following example, relations of technology Y may be inspired from the relations of technology X.

XA(2000)→YA(2001)
XB(2001)→YB(2003)
XC(2001)→YC(2002)
XD(2004)→a prediction may be made that Y would also combine with D, to form a new relation YD.

In the above example, XA means that technology X and A co-occurred in year 2000, YA means technology Y and A first co-occurred in year 2001. The symbol "→" means that the new relation of Y with A is inspired from X.

More formally, P(Y|X) is the likelihood that the relations of technology Y can be inspired by technology X. To estimate such likelihood, historical relations between technologies are utilized, which are represented in a CTTR table in some embodiments.

$R_X(t)$ is the set of technologies related to technology X at year t, and $N_X(t)$ is denoted as a set of technologies that were first time related to X at year t, which means that $N_X(t)$ is a subset of $R_X(t)$. $N_X(t)$ and $R_X(t)$ are extracted from the CTTR table by performing a query on technology X and then computing when a relation firstly appeared.

The union (U) of the set of technologies ($R_X$) related to technology X at years from 1 to t, is denoted as:

$$\widetilde{R}_X(t) = \cup_{1 \le p \le t} R_X(p) \quad (6)$$

If a history data table is available from year 1 to h, P(Y|X) is obtained as follows:

$$P(Y | X) = \frac{1}{Z_Y} \sum_{1 < t \le h} |\widetilde{R}_X(t-1) \cap N_Y(t)| \quad (7)$$

where $Z_Y$ is the normalization constant and |•| defines the size of a set.

If P(Y|X)>0, technology X is denoted as an inspiring technology to Y, because technology X brings new relations to Y. $A_Y$ is denoted as the set of all inspiring technologies for Y.

Given a technology k, which has not been related to Y before, the following score (Q) is computed to measure the possibility that k could potentially be related to Y:

$$Q(k|Y) = \Sigma_{X \in A_Y} P(Y|X) \text{score}(X, k) \quad (8)$$

where score(X, k) shows how technology X and k are related to each other. In some embodiments, score(X, k) corresponds to CooC(X, k), the simplest co-occurrence value, or the more advanced value TCorr(X, k) which captures a time trend.

In some embodiments, all technologies which have not been related to Y are ranked, based on measure Q(k|Y). The top ranked technologies are selected as the predicted technologies that may form new relations with Y.

At block 508 a user interface is provided. For example, one or more tables or results (e.g., predicted technologies that may form new relations with Y as described above) are presented to a user, and a user may be provided an ability to provide input or commands that influence the generation of one or more tables or results.

Figure 6:
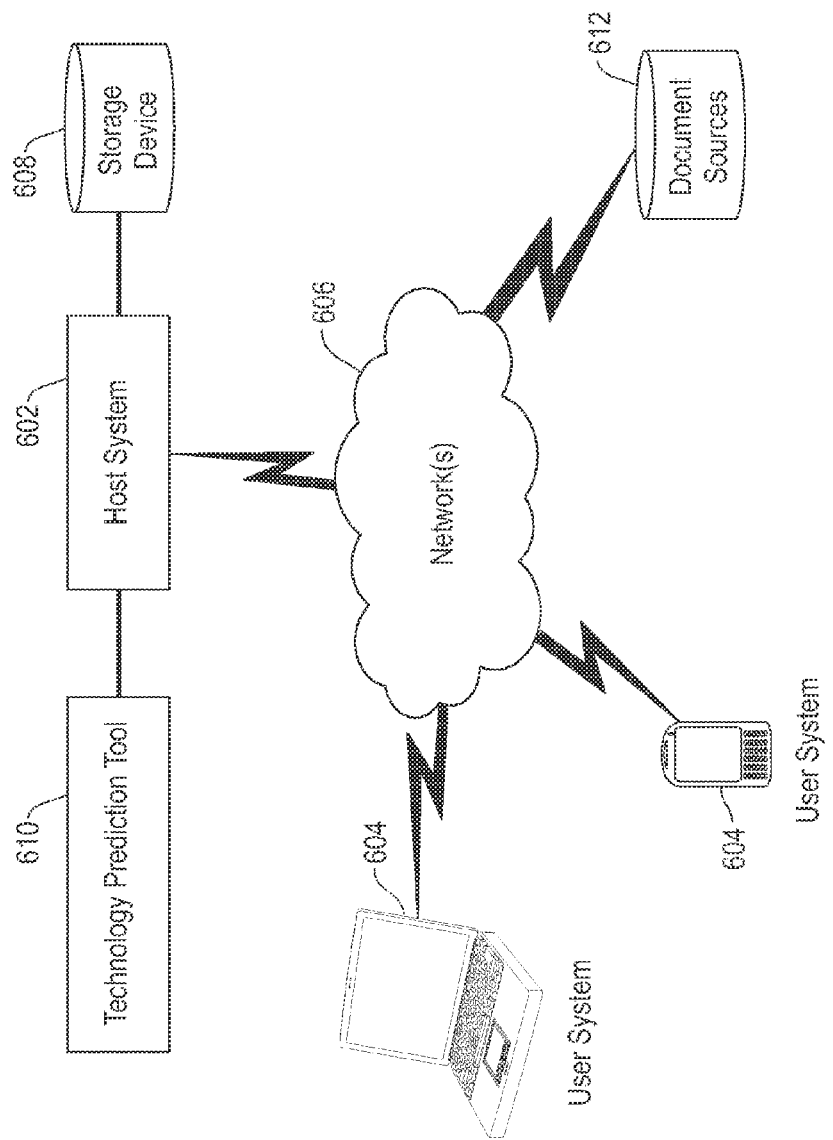
FIG. 6 depicts a system for performing technology prediction in accordance with an embodiment.

Turning now to FIG. 6, a system upon which technology prediction may be implemented in accordance with exemplary embodiments will now be described. In an exemplary embodiment, the system of FIG. 6 includes a host system 602 in communication with one or more user systems 604 and one or more technical document sources 612 over one or more network(s) 606.

In an exemplary embodiment, end users of the technology prediction tool 610 access the host system 602, via user systems 604, to perform technology prediction, in addition to accessing other functions provided by the host system 602. The user systems 604 may be implemented using general-purpose computers (e.g., a personal compute) executing a computer program for carrying out the processes described herein (e.g., a user system 604 may be operating a web browser). In exemplary embodiments, user systems 604 are implemented by mobile devices, such as cellular telephones and laptop computers, to communicate with the technology prediction system. While only two user systems 604 are shown in the system of FIG. 6, it will be understood that more than two user systems 604 may be implemented.

The host system 602 may be implemented using one or more servers operating in response to a computer program stored in a storage medium accessible by the server(s). The host system 602 may operate as a network server (e.g., a web server) to communicate with the user systems 604 and other network entities, e.g., a storage device 608. The host system 602 handles sending and receiving information to and from the user systems 604 and can perform associated tasks. In an exemplary embodiment, the host system 602 also executes logic to implement the technology prediction tool 610. The technology prediction tool 610 may be implemented as a distributed application, for example, all or a portion of the execution may be performed on one or more user systems 604.

The host system 602 is in communication with the storage device 608. The storage device 608 may be implemented using memory contained in the host system 602 or it may be a separate physical or logical device. In the exemplary embodiment shown in FIG. 6, the host system 602 is in direct communication with the storage device 608 (e.g., using physical cabling). In an alternative exemplary embodiment, the host system 602 may be in communication with the storage device 608 over the network(s) 606. It will be understood by one of ordinary skill in the art, however, that other network implementations may be utilized. For example, the storage device 608 may be logically addressable as a consolidated data source across a distributed environment that includes one or more of the networks 606. Information stored in the storage device 608 may be retrieved and manipulated via the host system 602. The storage device 608 stores a variety of information for use in performing technology prediction processes as described herein. The storage device 608 may store, for example, technical documents, a CTTR table, and a TT table.

In an exemplary embodiment, document sources 612 include any source of technical documents such as a repository of patents (e.g., the PTO website), an IEEE library, etc. For ease of explanation, only a single storage device 608 is shown in FIG. 6. However, it will be understood by one of ordinary skill in the art that any number of such storage devices may be accessed by the host system 602 in order to realize the advantages of the exemplary embodiments described herein.

Network(s) 606 may include any type of known network including, but not limited to, a wide area network (WAN), a local area network (LAN), a global network (e.g., Internet), a virtual private network (VPN), and an intranet. The network(s) 606 may be implemented using a wireless network or any kind of physical network implementation known in the art, e.g., using cellular, satellite, and/or terrestrial network technologies. A user system 604 may be coupled to the host system 602 through multiple networks (e.g., intranet and Internet) so that not all user systems 604 are coupled to the host system 602 through the same network.

Technical effects and benefits include the identification of one or more future relationships between technologies.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for technology prediction, the method comprising:
    constructing a technical dictionary based on a collection of documents, the technical dictionary comprising technical terms;
    partitioning the technical terms into equivalence classes;
    generating a table that correlates technical terms across equivalence classes based on temporal co-occurrence of the technical terms across the equivalence classes; and
    for a given technical term:
        accessing the table to determine a first set of technical terms that correlate to the given technical term;
        accessing the table to determine a second set of technical terms that correlate to the first set of technical terms, the second set of technical terms determined based on a computation of a co-occurrence score and a time-based correlation between the second set of technical terms and the first set of technical terms; and
        predicting a candidate formation of new technology that merges a technology corresponding to the first set of technical terms with a second technology corresponding to the second set of technical terms, the predicting based on associations determined among the first set of technical terms and the second set of technical terms, the associations determined as a function of changes over time in the co-occurrence score and the time-based correlation.

2. The method of claim 1, wherein the collection of documents comprises at least one patent document.

3. The method of claim 1, wherein constructing the technical dictionary comprises converting non-text formatted documents into a text format.

4. The method of claim 1, wherein partitioning the technical terms into equivalence classes comprises applying at least one of: a coreference resolution, a plural-to-singular conversion, a synonym mapping, an acronym mapping, and a higher-to-lower case conversion.

5. The method of claim 1, wherein entries of the table comprise an interval of time, one or more scores, and a set comprising a subset of the technical terms.

6. The method of claim 5, wherein:
    the interval of time comprises at least one of a second, a minute, an hour, a day, a week, a month, a quarter, and a year; and
    the one or more scores comprises at least one of: a number of documents where the subset of the technical terms occurs, a number of paragraphs where the subset of the technical terms occurs, and a number of sentences where the subset of the technical terms occurs.

7. The method of claim 1, wherein the first set of terms is determined based on a computation of a co-occurrence score and a time-based correlation between the first set of terms and the given technical term.

8. The method of claim 1, wherein the first set of terms is determined based on a computation of a time-based correlation between the first set of terms and the given technical term.

9. A computer program product for technology prediction, the computer program product comprising:
    a computer readable storage medium having program code embodied therewith, the program code executable by a processor to:
    construct a technical dictionary based on a collection of documents, the technical dictionary comprising technical terms;
    partition the technical terms into equivalence classes;
    generate a table that correlates technical terms across equivalence classes based on temporal co-occurrence of the technical terms across the equivalence classes; and
    for a given technical term:
        access the table to determine a first set of technical terms that correlate to the given technical term;
        access the table to determine a second set of technical terms that correlate to the first set of technical terms, the second set of technical terms determined based on a computation of a co-occurrence score and a time-based correlation between the second set of technical terms and the first set of technical terms; and predict a candidate formation of new technology that merges a technology corresponding to the first set of technical terms with a second technology corresponding to the second set of technical terms, the predicting based on associations determined among the first set of technical terms and the second set of technical terms, the associations determined as a function of changes over time in the co-occurrence score and the time-based correlation.

10. The computer program product of claim 9, wherein the first set of terms is determined based on a computation of a co-occurrence score and a time-based correlation between the first set of terms and the given technical term.

11. The computer program product of claim 9, wherein the first set of terms is determined based on a computation of a time-based correlation between the first set of terms and the given technical term.

12. The computer program product of claim 9, wherein partitioning the technical terms into equivalence classes comprises applying at least one of: a coreference resolution, a plural-to-singular conversion, a synonym mapping, an acronym mapping, and a higher-to-lower case conversion.

13. The computer program product of claim 9, wherein entries of the table comprise an interval of time, one or more scores, and a set comprising a subset of the technical terms.

14. The computer program product of claim 13, wherein:
the interval of time comprises at least one of a second, a minute, an hour, a day, a week, a month, a quarter, and a year; and
the one or more scores comprises at least one of: a number of documents where the subset of the technical terms occurs, a number of paragraphs where the subset of the technical terms occurs, and a number of sentences where the subset of the technical terms occurs.

15. A system for technology prediction, the system comprising:
a memory having computer readable instructions; and
a computer processor for executing the computer readable instructions, the instructions including:
constructing a technical dictionary based on a collection of documents, the technical dictionary comprising technical terms;
partitioning the technical terms into equivalence classes;
generating a table that correlates technical terms across equivalence classes based on temporal co-occurrence of the technical terms across the equivalence classes; and
for a given technical term:
accessing the table to determine a first set of technical terms that correlate to the given technical term;
accessing the table to determine a second set of technical terms that correlate to the first set of technical terms, the second set of technical terms determined based on a computation of a co-occurrence score and a time-based correlation between the second set of technical terms and the first set of technical terms; and
predicting a candidate formation of new technology that merges a technology corresponding to the first set of technical terms with a second technology corresponding to the second set of technical terms, the predicting based on associations determined among the first set of technical terms and the second set of technical terms, the associations determined as a function of changes over time in the co-occurrence score and the time-based correlation.

16. The system of claim 15, wherein the first set of terms is determined based on a computation of a co-occurrence score and a time-based correlation between the first set of terms and the given technical term.

17. The system of claim 15, wherein the first set of terms is determined based on a computation of a time-based correlation between the first set of terms and the given technical term.

18. A method for technology prediction, the method comprising:
determining current relationships between technologies, the determining comprising:
constructing a list of technical terms based on a collection of technical documents;
grouping the technical terms into technologies; and
generating a table that correlates the technologies based on temporal co-occurrence of the technologies in the technical documents; and
predicting a candidate formation of a new technology that merges two or more of the technologies, the predicting comprising, for each technology:
locating a first set of technologies in the table that correlate to the technology;
locating a second set of technologies in the table the correlate to the first set of technologies; and
identifying the second set of technologies as having a future relationship to the technology, the identifying based on associations determined among the first set of technical terms and the second set of technical terms, the associations determined as a function of changes over time in a co-occurrence score and a time-based correlation among technical terms associated with the first set of technologies and the second set of technologies.

* * * * *